E. KELLY.
MECHANISM FOR UNLOADING WAGONS.
APPLICATION FILED JAN. 29, 1919.
1,313,388.
Patented Aug. 19, 1919.
2 SHEETS—SHEET 2.
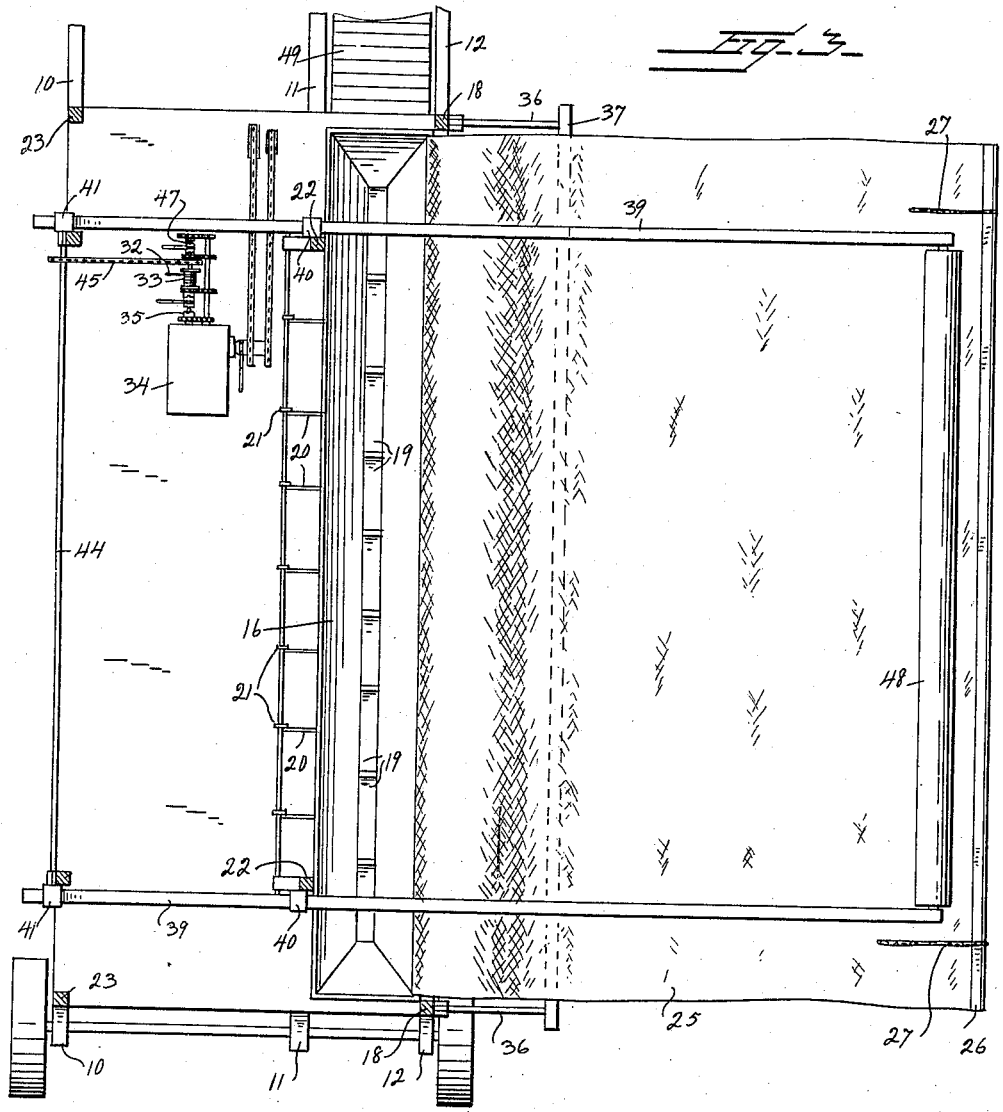
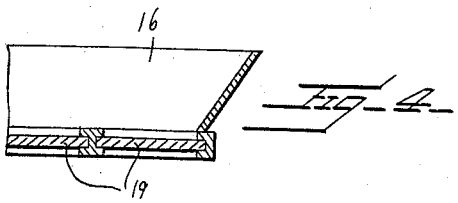
Inventor
E. Kelly
By Watson E. Coleman
Attorney

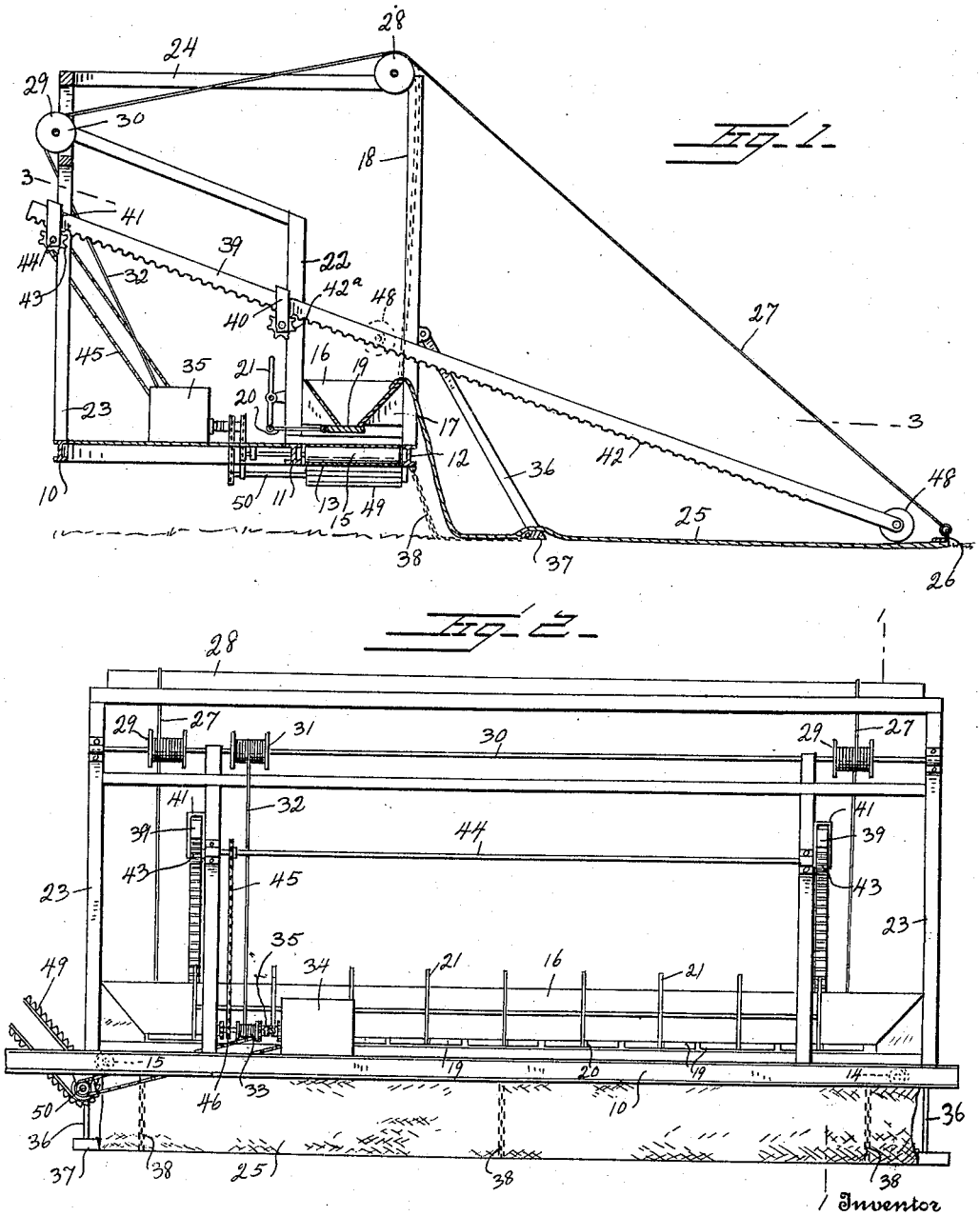

UNITED STATES PATENT OFFICE.

EDWIN KELLY, OF CAZENOVIA, WISCONSIN.

MECHANISM FOR UNLOADING WAGONS.

1,313,388. Specification of Letters Patent. Patented Aug. 19, 1919.

Application filed January 29, 1919. Serial No. 273,820.

*To all whom it may concern:*

Be it known that I, EDWIN KELLY, a citizen of the United States, residing at Cazenovia, in the county of Richland and State of Wisconsin, have invented certain new and useful Improvements in Mechanisms for Unloading Wagons, of which the following is a specification, reference being had to the accompanying drawings.

This invention relates to unloading platforms, and particularly to that type of unloading platform which is illustrated in the patent granted to me on October 23, 1917, No. 1,243,948.

In the unloading platform which was patented to me as above stated, there is provided a longitudinally extending conveyer having a superimposed hopper and a pivoted platform supported on the side of the conveyer and so arranged that wagons can discharge their loads onto the platform, drive off therefrom, and then the platform can be raised to discharge its contents into the hopper and so into the conveyer. This platform, in the practical construction of the device, was necessarily disposed about two feet above the ground and flash boards had to be used in order for wagons to drive on to the platform. It is thus difficult for a wagon to be driven on the platform, and furthermore the platform itself is relatively heavy and therefore requires considerable power in order to tilt it to discharge its contents.

The general object of the present invention is to improve upon the style of platform illustrated in said patent and primarily by providing in place of the platform an apron of canvas or like material which would normally lie flat upon the ground and upon which the wagons could be driven to discharge their load, and provide means whereby the free edge of the apron may be raised to thereby cause the apron to roll its contents into the hopper.

A further object in this connection is to provide improved means for carrying the apron back to its initial position flat upon the ground when it has discharged its contents.

Still another object is to provide motor operated means for raising the apron and for shifting it back to its flat and unloaded position.

Still another object is to provide means for controlling the discharge of material from the hopper to the endless carrier so that the amount of material discharged into the endless carrier may be regulated and controlled.

Still another object is to provide a mechanism of this character which is simple in its construction, may be easily operated, requires but comparatively little power, and is thoroughly effective in actual practice.

My invention is illustrated in the accompanying drawings, wherein:—

Figure 1 is a vertical transverse sectional view of an unloading apparatus constructed in accordance with my invention;

Fig. 2 is a rear elevation;

Fig. 3 is a top plan view; and

Fig. 4 is a fragmentary longitudinal section of the hopper and its discharge gates.

Referring to these drawings, it will be seen that the base of my unloading mechanism includes a frame having as part thereof three longitudinally extending I-beams designated 10, 11 and 12 respectively. The I-beams 11 and 12 are disposed relatively close to each other, as between these beams is disposed the longitudinally extending conveyer 13 which may be of any suitable character and which is endless in form and mounted upon rollers 14 and 15, the roller 15 being the driving roller, as will hereafter appear. It will be understood, of course, that the shafts of these rollers are mounted in suitable bearings in the frame of the machine and that any number of intermediate rollers may be used between the rollers 14 and 15 in order to support the endless carrier. Disposed above the endless carrier is a longitudinally extending hopper 16 having downwardly converging side walls which may be supported by brackets 17 mounted on vertical standards 18 extending upward from the I-beams 12. Passage from the hopper onto the endless conveyer 13 is controlled by a series of gates or valves 19 mounted in suitable slideways attached to the bottom of the hopper and each of these gates is connected by a rod 20 to a controlling lever 21 mounted on uprights 22 extending upward from the I-beam 11. It is obvious that means may be provided for holding the levers 21 set in any desired position so as to control the passage of material from the hopper onto the conveyer, and I do not wish to be limited to any specific manner for controlling these gates 19 or holding the levers set in their adjusted positions.

As before stated, there are uprights 18 mounted on the beams 12 and corresponding uprights 23 mounted on the beams 10, these uprights being connected by cross braces or bars 24 at their upper ends. Attached to one side wall of the hopper is a sheet 25 which may be made of canvas or any other suitable flexible material and which, in its receiving position, is adapted to lie flat upon the ground. Attached to the outer edge of this sheet of canvas and extending longitudinally of the machine is an angle iron strip 26 to which cables 27 are attached, these cables passing over pulleys 28 mounted on the cross bars 24, these cables in turn passing over winding drums 29 mounted on a shaft 30 also carrying a winding drum 31. Wrapped upon the winding drum 31 is a cable 32 which extends down to a reel or winding drum 33 which is driven by a motor or engine 34. A double acting clutch 35 is provided whereby to connect this reel 33 to the motor 34 in order to drive the reel in one direction or so connect it to the engine that it may be driven in the other direction, or the clutch may be used which will simply connect or disconnect the reel 33 with the engine. Pivotally mounted upon the uprights 18 are braces 36 which, when the machine is in operation, extend downward and outward in the manner indicated in Fig. 1. These braces at the lower end carry a transverse bar 37 which is designed to rest upon the ground beneath the apron 25. These braces 36 act to support the uprights 18 and brace the frame or superstructure, and are pivotally connected to the uprights 18 in order that the braces may be folded up in position for transportation. Stay chains 38 are attached to the I-beam 12 and to the lower ends of the braces 36.

With the mechanism heretofore described, the apron may be lifted from a horizontal to a vertical position and discharge its contents into the hopper, and for the purpose of providing means for carrying the apron back from its vertical position to its horizontal position and spreading the apron flat upon the ground, I provide at opposite ends of the machine the transversely extending rack bars 39. These rack bars are mounted in guides 40 and 41, in turn mounted upon the uprights 22 and 23 respectively. There are four of these guides, the pair of guides 41 being disposed higher than the pair of guides 40. The under faces of the bars 39 are formed with rack teeth 42 and mounted upon the guides 41 are the gear wheels 43 carried by a shaft 44, the teeth of which gear wheels mesh with the rack teeth 42. The guides 40 and 41 are also provided with idler gear wheels 42ᵃ and 43 respectively which mesh with the teeth 42. The shaft 44 is driven by a pulley over which passes a belt or sprocket chain 45 which in turn extends over a suitable driving sprocket wheel or pulley 46 connected to the motor or engine by a double acting clutch 47 so that the gear wheels 41 may be driven in either direction. The lower ends of the bars 39 are connected by means of a longitudinally extending roller 48. It is to be understood that after the apron has been lifted to discharge its contents, the clutches controlling the movement of the apron are reversed and the clutches controlling the movement of the bars 39 are thrown in so that these bars 39, with the roller 48, are shifted outward and the roller 48 contacting with the apron forces it downward and stretches it out flat upon the ground. Then the clutches controlling the movement of the bars 39 are reversed and the bars and the roller 48 are shifted back to the position shown in dotted lines in Fig. 1, thus leaving the apron unobstructed and permitting the teams to drive upon the apron and discharge the load thereon.

It will be seen that when the clutches connecting the motor to the apron are shifted to cause the rotation of shaft 30, the cables 27 will be wound up on the pulleys 29 thus causing the raising of the apron. The outer margin of the apron will be lifted first and then gradually as the cables 27 are wound up more and more upon their respective drums, the apron will move inward and the material will be gradually shifted inward and rolled, as it were, toward the hopper and then discharged thereinto when the apron is in the vertical position illustrated in dotted lines in Fig. 1. Then, as before stated, the bars 39 are caused to move outward and again spread the apron.

The endless conveyer 13 may discharge upon any suitable chute or conveyer, but I have illustrated for this purpose a conveyer 49 which extends upward and outward and which is driven by a shaft 50 operatively connected to the motor by a sprocket chain connection or by belting, and preferably this endless conveyer 49 discharges into a bin or into bins from which the sand, gravel, or other material may be taken as desired. The particular construction of the bin, of course, forms no part of the present invention. Preferably, the base frame of the machine will be mounted upon wheels so that the unloading device may be shifted from place to place and readily transported.

I have found in practical use that this unloading device is extremely simple and effective, it requires but little power, and does not readily get out of order. It is particularly effective for the reason that the apron lies flat upon the ground so that there is no obstruction to the entrance thereon of wagons. Furthermore, by the rolling action of the apron, the materials deposited thereon are to a certain extent mixed as they are discharged into the hopper.

While I have illustrated a form of my invention which, as before stated, I have found thoroughly effective in practice, yet it is to be understood that many changes might be made in the details of construction and in the arrangements of parts without departing from the spirit of the invention.

I claim:—

1. An unloading mechanism of the character described including a supporting frame, an apron of flexible material having one edge operatively attached to the supporting frame and upon which material may be unloaded, means connected to the free edge of the apron whereby it may be lifted to thereby discharge the contents of the apron, means for lowering the free edge of the apron, and means for simultaneously spreading the apron flat upon the ground.

2. An unloading mechanism of the character described including a supporting frame, an apron of flexible material attached at one edge to the supporting frame, said apron being adapted to lie upon the ground to receive a load, motor operated means mounted upon the frame for raising the free edge of the apron to thereby discharge the contents of the apron, means whereby the free edge of said apron may be lowered, and power operated means laterally shiftable with relation to the apron for positively shifting the apron downward and outward and spreading it flat on the ground.

3. An unloading mechanism of the character described including a supporting frame, an apron of flexible material attached at one edge to the supporting frame, said apron being adapted to lie upon the ground to receive a load, motor operated means mounted upon the frame for raising the free edge of the apron to thereby discharge the contents of the apron, means for lowering the free edge of said apron, power operated means, laterally shiftable with relation to the apron, for positively shifting the apron downward and outward and spreading it on the ground, including a roller shiftable across the upper face of the apron.

4. A mechanism of the character described including a supporting frame, an endless carrier mounted upon the frame, a hopper discharging into the carrier, an apron of flexible material attached to the hopper and normally lying flat upon the ground to receive a load, motor-operated means for lifting the outer free edge of the apron, a roller movable across the upper face of the apron, and means for shifting the roller outward and downward toward the outer edge of the apron to spread the apron and for shifting the roller inward toward and beyond the hopper.

5. An unloading mechanism including a supporting frame, a hopper mounted thereon, an apron attached to the edge of the hopper and normally disposed flat upon the ground, a motor, cables operatively connected to the free edge of the apron, winding mechanism over which said cables pass and operatively connected to the motor whereby the free edge of the apron may be lifted to discharge the contents of the apron into said hopper, transversely extending bars mounted upon the frame, a roller carried at the ends of said bars and extending parallel to the length of the apron, and motor operated means for shifting said bars inward before the apron is lifted and shifting said bars outward to carry the roller across the face of the apron as the apron is lowered.

6. A mechanism of the character described comprising a wheeled supporting frame, a hopper or receiver mounted thereon, a superstructure carried on the frame, an apron of flexible material attached to one edge of the hopper and normally extending out therefrom and lying flat upon the ground, a bar attached to the free edge of the apron, motor operated winding means, cables attached to said bars and operatively connected to the winding means, means for releasing the winding means from its connection with the motor, transversely extending downwardly and outwardly inclined bars slidingly mounted upon said superstructure and carrying a roller at their outer ends adapted to engage with said apron, motor driven means engaging said bars to cause their retraction or projection, and means for manually controlling the direction in which said bars are shifted by the motor.

7. An unloading mechanism including a wheeled supported base frame, a superstructure mounted thereon, an endless carrier carried by the frame, a hopper disposed therefrom, an apron of flexible material attached at one edge to said hopper and normally lying flat upon the ground to receive a load, a shaft having winding drums thereon and mounted on the superstructure, cables attached to the free edge of the apron and connected to the winding drums, a motor, means for operatively connecting the motor to the winding drums or disconnecting it therefrom, guides mounted upon the superstructure, gear wheels carried by said guides, transversely extending rack bars mounted in said guides and engaged by the gear wheels and carrying a roller at their outer ends adapted to operate over the face of the apron, and motor operated means for driving said gear wheels in opposite directions and including a double acting clutch.

8. An unloading mechanism of the character described including a frame adapted to be supported on the ground, a trough-shaped receiving member mounted on the frame, an apron of flexible material, one edge of the apron being attached to the receiving member, the apron normally extending laterally of said frame and lying flat upon the ground whereby a wagon may be driven upon the apron and its contents discharged thereon, a cable operatively connected to the free edge of the apron and extending to a point over the receiving member, power operated means for engaging the cable to thereby raise the free edge of the apron and gradually raise the apron from a horizontal to a vertical position to discharge the contents of the apron into the receiving member, and means for releasing said cable from the power operated means to permit the lowering of the apron.

9. An unloading mechanism of the character described including a frame adapted to be supported on the ground, a trough-shaped receiving member mounted on the frame, an apron of flexible material, one edge of the apron being attached to the receiving member, the apron normally extending laterally of said frame and lying flat upon the ground whereby a wagon may be driven upon the apron and its contents discharged thereon, a cable operatively connected to the free edge of the apron and extending to a point over the receiving member, power operated means for engaging the cable to thereby raise the free edge of the apron and gradually raise the apron from a horizontal to a vertical position to discharge the contents of the apron into the receiving member, means for releasing said cable from the power operated means to permit the lowering of the apron, means for again forcing the apron laterally of the frame and disposing it flat upon the ground including a member having a length equal to the width of the apron, and manually controllable, power operated means operatively engaging said member to force it laterally and downward to thereby carry the apron from its vertical position to a horizontal position.

In testimony whereof I hereunto affix my signature in the presence of two witnesses.

EDWIN KELLY.

Witnesses:
H. E. BLANK,
CHAS. BRIGGS.

Copies of this patent may be obtained for five cents each, by addressing the "Commissioner of Patents, Washington, D. C."